Oct. 11, 1960    R. K. STRASEL    2,955,402
ROTARY MOWER WITH CATCHER FOR GRASS OR THE LIKE
Filed Sept. 9, 1957    2 Sheets-Sheet 1
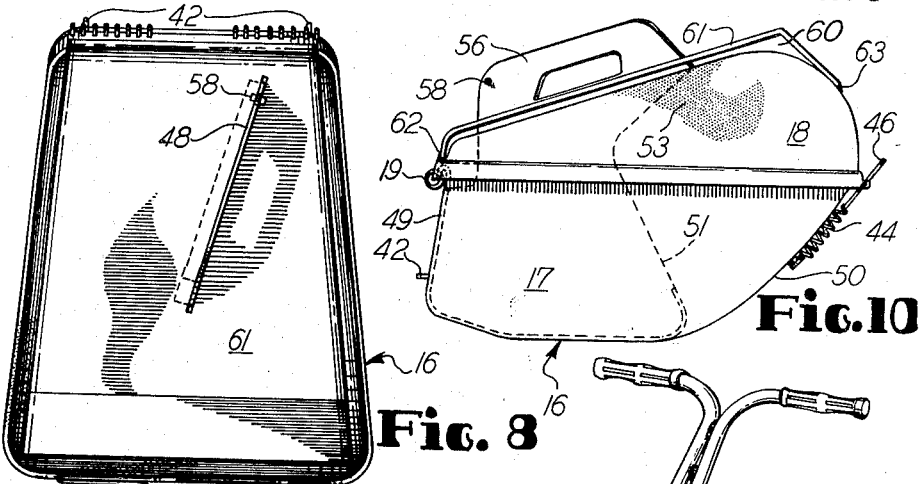
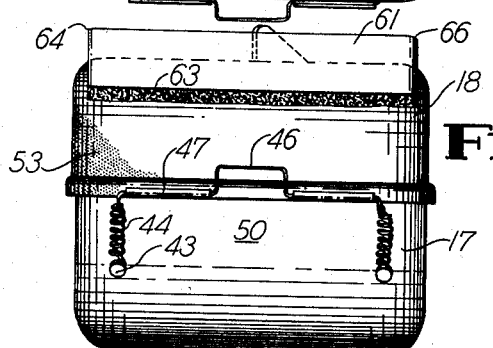
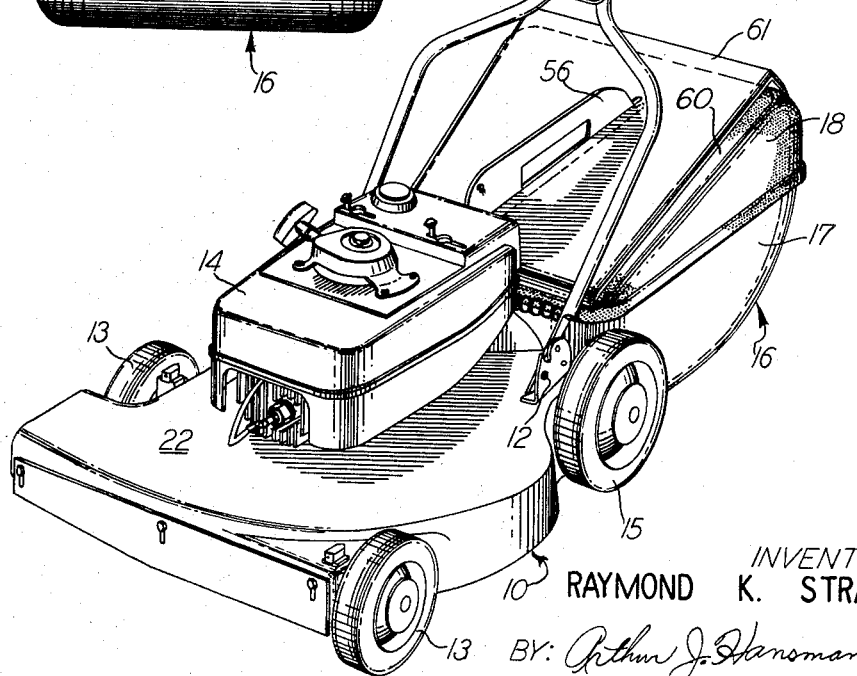
INVENTOR:
RAYMOND K. STRASEL
BY: Arthur J. Hansmann
ATTORNEY Oct. 11, 1960 R. K. STRASEL 2,955,402
ROTARY MOWER WITH CATCHER FOR GRASS OR THE LIKE
Filed Sept. 9, 1957 2 Sheets-Sheet 2

INVENTOR:
RAYMOND K. STRASEL
BY: Arthur J. Hansmann
ATTORNEY

United States Patent Office 2,955,402
Patented Oct. 11, 1960

2,955,402

ROTARY MOWER WITH CATCHER FOR GRASS OR THE LIKE

Raymond K. Strasel, Winthrop Harbor, Ill., assignor to Jacobsen Manufacturing Co., Racine, Wis., a corporation of Wisconsin Filed Sept. 9, 1957, Ser. No. 682,863

6 Claims. (Cl. 56—25.4)

This invention relates to a rotary lawn mower and grass catcher combination.

It is an object of this invention to provide a rotary lawn mower and grass catcher combination wherein the grass clippings can be accumulated in the catcher as they are discharged from the mower, and to avoid the common problem of the clippings clinging to the under-surface of the housing or deck when moving in damp grass with a rotary type of mower.

Another object of this invention is to provide a combined rotary mower and grass catcher wherein the grass clippings will actually be packed in the catcher and, therefore, a considerable quantity of clippings can be accumulated in the grass catcher.

Still another object of this invention is to provide a rotary lawn mower and grass catcher combination wherein the normal use of the mower is not impeded by the catcher extending to the front of the mower to block the view of the operator or to the side of the mower to collide with objects, such as buildings, trees, or hedges located outside of the path of the mower. In accomplishing this particular object, the catcher is disposed immediately behind the mower housing within the lateral limits of the housing and underneath the mower handle to be completely out of the way of the operator and clear of the said objects outside the path of the mower.

Another object of this invention is to provide a grass catcher which can be readily and easily mounted onto and dismounted from the housing of a rotary mower without the requirement of elaborate attaching means such as bolts, braces, or the like.

Another object of this invention is to provide a grass catcher for a rotary mower wherein the catcher is inexpensive, lightweight, sturdy, and easily emptied of its accumulated grass clippings.

Still another object of this invention is to provide a grass catcher and rotary mower combination wherein the grass clippings do not accumulate on the entrance walls of the catcher and thereby clog the perforations or air discharge openings in the catcher. This particular object is accomplished by the provisions of a partition within the catcher with the partition serving to define an air passage at the inlet of the catcher such that the velocity of the inlet air is maintained at a high speed and thus deters the accumulation of clippings at the entrance of the catcher.

Still another object of this invention is to provide a combined rotary lawn mower and grass catcher wherein there is an improved manner of dissipating the exhaust from the gasoline engine of the mower.

Still a further and fundamental object of this invention is to provide a rotary mower and grass catcher wherein the grass clippings are accumulated in a packed condition in one section of the catcher with the section being operatively farthest away from the inlet opening of the catcher so that the clippings are packed in said one section and continue to fill the catcher with a minimum amount of interference to the inlet opening of the catcher.

Other objects and advantages will become apparent upon reading the following description in conjunction with the accompanying drawings, wherein:

Fig. 1 is a front perspective view of a preferred embodiment of a combined rotary lawn mower and a grass catcher of this invention.

Fig. 8 is a top plan view of the catcher.

Fig. 9 is a rear elevational view of the catcher shown closed.

Fig. 10 is a left side elevational view of the catcher.

The same reference numerals refer to the same parts throughout the views.

Figure 2:
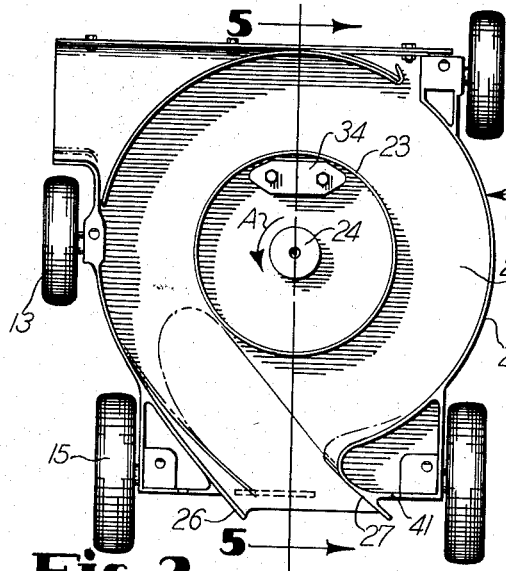
Fig. 2 is a bottom plan view of the rotary mower with parts removed.

Fig. 1 shows a rotary lawn mower including a housing or a deck 10, of a generally cylindrical shape in plan view, and a handle 11 pivotally attached to the housing by mounting bolts, such as the shown bolt 12, and extending upwardly and rearwardly from the mower housing 10. Suitable ground wheels 13 and 15 are mounted on the mower housing, and the usual gasoline engine 14 is also shown mounted on the housing for driving the rotor disposed within the housing and hereinafter described. A grass catcher 16 is also shown mounted on the housing 10 at the rear thereof to be disposed within the lateral limits of the housing and beneath the handle 11. With this general arrangement of the mower housing 10 and the catcher 16, the latter is not projecting to either side of the housing to interfere with movement of the mower past buildings, trees, and like objects, and also the basket does not interfere with the operator's view of the grass to be moved.

Figure 7:
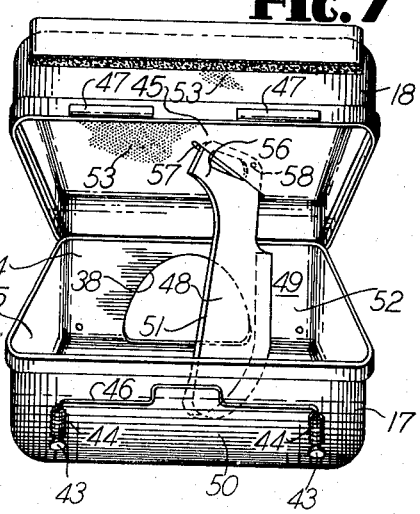
Fig. 7 is a rear view of the catcher shown open.
Figure 6:
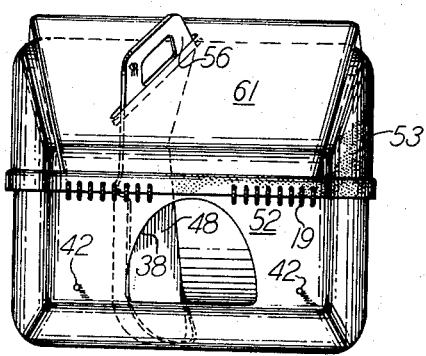
Fig. 6 is a front elevational view of the catcher.
Figures 3, 5:
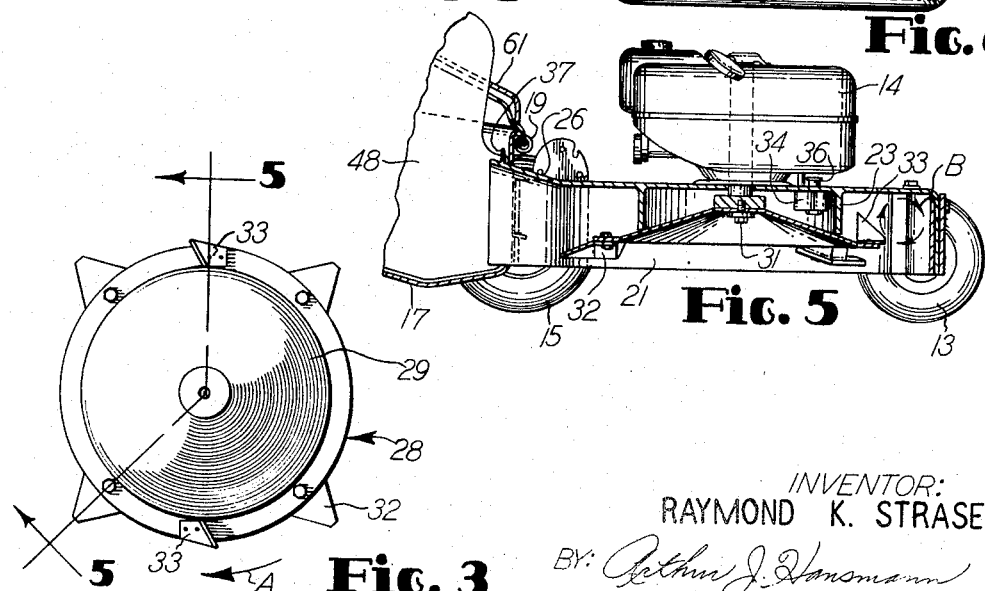
Fig. 3 is a top plan view of the rotor employed in said mower.
Fig. 5 is a side sectional view showing a fragment of the mower and catcher combined and with the section taken on the line 5—5 of Figs. 2 and 3.

Of course, the catcher 16 is removably mounted on the rear end of the housing 10 so that when the catcher is filled with grass clippings, it can be readily and easily removed from the housing for emptying the clippings from the catcher. Fig. 5 shows the manner in which the catcher is mounted on the housing, and Fig. 7 shows the catcher open, as it is composed of a lower section 17 and an upper section 18 which are hinged together by means of ring members or hinges 19 as shown in Figs. 6 and 10. The catcher has a hollow interior and is, therefore, termed shell-type. Fig. 2 shows an underneath interior of the housing 10, and it will here be noted that the housing is provided with an outer circular baffle or flange 21 which depends from the top surface 22 of the housing to terminate slightly spaced above the ground, as shown in Fig. 5. An interior baffle or ring 23 also depends from the housing top 22, but the baffle 23 is shown to be shorter than the baffle 21, as shown in Fig. 5. The usual engine shaft 24 projects through the housing top 22 such that the shaft 24 and the baffle 23 and the baffle 21 are all concentric. A chute or spout 26 is formed on the rear of the housing 10 to be tangential with the annulus-like space 25 defined by the baffles 21 and 23, and the chute thus projects rearwardly at an oblique angle to the forward direction of movement of the mower housing 10. The chute 26 is of an inverted U-shape as shown in Fig. 4, and it defines an outlet opening 27 in the housing 10.

Figure 4:
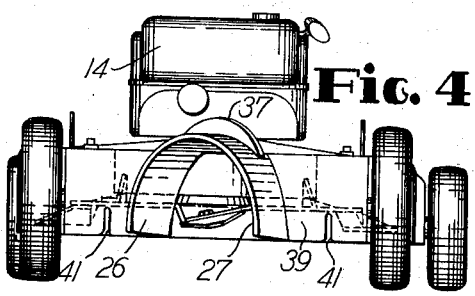
Fig. 4 is a rear elevational view of the mower shown in Fig. 2 with the rotor of Fig. 3 added thereto.

Figs. 3, 4, and 5 show a mower rotor generally designated 28, and the rotor is shown to consist of a frustoconical plate 29 which is attached to the engine shaft 24 by means of the bolt 31 as shown in Fig. 5. It is important to note that the plate 29 extends beyond the circumferential limits of the inner baffle 23, and the outer circumference of the plate 29 has attached thereto a plurality of grass cutting blades 32 and a plurality of fan blades 33. The rotor plate is generally as shown and described in U.S. Patent No. 2,737,772. The direction of rotation of the shaft 24 and the rotor 28 is as indicated by the arrows "A" in Figs. 2 and 3, such that the grass clippings, cut by the blades 32, and the air, blown by the blades 33, are discharged in a stream from the housing 10 through the outlet 27 which is disposed at the tangential and, therefore, most efficient angle, as mentioned. Fig. 5 shows that both types of blades are disposed in the annulus between the baffles 21 and 23, and since the plate 29 overlaps the inner ring or baffle 23, it has been found that the grass clippings, dust, dirt, and other debris cannot enter within the confines of the ring 23 and accumulate on the underneath surface of the housing or deck top 22. Further, the provision of the fan blades 33 provides a circular or turbulent action of air in the annulus, such that the air takes the path indicated by the arrows "B" in the annulus on Fig. 5, and this further prevents the grass clippings and debris from accumulating in the housing 10. Fan blades 33 are, therefore, shaped as shown to induce a turbulent action of the air within the housing 10 to keep the latter clean and free of grass clippings which would otherwise accumulate in the housing when the mower is used in wet grass and the clippings are impinged against the undersurface of the housing. With the type of rotor described and its fan blades 33, there is also created a suction-lift from the ground beneath the housing, and this lift keeps the clippings from falling onto the ground, but it also draws dust and light debris into the housing. Such dust and debris is prevented from entering inside the ring 23 by the plate 29, and it is eventually discharged into the catcher 16.

At this time it should also be noted that the engine muffler 34 is bolted to the underneath surface of the deck 10 to receive the exhaust from the engine 14 in the usual manner. The muffler is located within the confines of the baffle 23, and Fig. 5 shows the muffler has an exhaust pipe 36 extending upwardly therefrom through the housing top 22 such that the final exhaust is above the housing rather than below the housing top 22. The particular provision of the circular rotor plate 29 forming a chamber with the housing top 22 and the baffle 23 provides a unique structure wherein the muffler 34 is located, and an improved muffler action results. It should now be understood that the provision of the rings or baffles 21 and 23 provides an interior annulus-like space in which the cutting and fan blades operate, and the air is moved by the fan blades through the annulus at a high velocity by virtue of the provision of the inner baffle 23 forming a wall for the high velocity of the air being discharged to the opening 27. In this manner, it has been found that the grass clippings can be adequately retained in the housing and moved therearound to be discharged through the opening 27 and into the basket 16, as desired.

Figs. 2, 4, and 5 show the chute 26 extending rearwardly and angularly of the housing 10, and a lug or projection 37 is disposed on the top surface of the chute 26. Figs. 6 and 7, along with Fig. 5, show that the front of the catcher lower section 17 has an inlet opening 38 which receives the rearward end of the chute 26, such that the upper edge of the catcher front wall defining the opening 38 is disposed beyond the lug 37 to hook thereover in mounting the catcher on the chute 26. Fig. 4 shows the rear wall 39 of the housing 10 to be provided with two indentations or slots 41 at the lower edge thereof such that the slots 41 respectively register with the alignment pins or bolts 42 on the front wall of the catcher 16 and thus the pins 42 are received in the slots 41, as shown in Fig. 5. In this manner, the catcher 16 is mounted on the housing 26 with the front wall of the catcher abutting the rear wall 39 of the housing, and the catcher opening and chute lug 37, along with the alignment pins described, maintain the catcher on the housing until the rear end of the catcher is tilted upward to remove the alignment pins from the slots 41, and subsequently the catcher opening 38 can be removed from the lug 37. With this arrangement, the catcher is firmly mounted on the housing 10 such that only the tilting action will remove the catcher, and when a rise in the ground or a bump is encountered by the bottom of the catcher, the latter will not be jarred or pushed off the housing of the mower since only the described tilting action will remove the catcher from the housing.

At this time it should be noted that the catcher lower section 17 is formed of a solid imperforate material and is preferably made of a light weight and flexible plastic while the catcher upper section 18 is formed of the same plastic material but is perforate, and the two sections are hinged together as mentioned. Fig. 7 shows the lower section 17 provided with anchor pins 43 which have attached thereto tension coil springs 44. The springs 44 retain a rigid handle and latch 46 which can be readily positioned over the channel shaped lips 47 on the rear wall of the upper section 18. Fig. 9 shows the handle 46 positioned to secure the two sections together. The two sections 17 and 18 form what can be termed to be a shell-type of catcher having, of course, a hollow interior 45 for the storage and accumulation of grass clippings discharged from the mower housing to the catcher.

Fig. 7, particularly, shows the provision and location of a partition 48 which is attached to the bottom section 17 along the bottom wall thereof and the front wall 49. It is significant that the partition 48 is disposed at an angle, as shown also in Fig. 8, with the angle corresponding to the angle of the chute 26 in the housing 10. Also, the rear edge 51 of the partition 48 terminates spaced from the rear wall 50 of the catcher. The arrangement is such that the air and clippings entering the catcher through the opening 38 continue into the catcher at substantially the angle of movement through the chute 26, and, due to the chute angle shown in Fig. 2 and the catcher location and shape, the stream is directed initially against the catcher side 55 and the clippings are blown around the rear edge 51 of the partition and they accumulate in a section designated 52 which is to the right of the partition 48 and to the front of the catcher 16, as viewed in Fig. 7. Of course, the air discharged into the catcher is released therefrom through the perforations in the upper section 18, and these perforations are indicated by the areas designated 53. It has been found that the catcher 16 thus operates to pack the grass clippings into the section 52 while the catcher left front section, designated 54, remains clear of the clippings, as the blast of air from the housing is strongest through this entrance section of the catcher. The catcher 16 can, therefore, accumulate a great quantity of clippings since the latter are actually packed within the catcher along the right side of the partition 48.

To facilitate handling of the catcher 16, the upper end of the partition 48 has the handle 56 incorporated therein, and the handle projects through a slot 57 in the upper section 18 so that the catcher can be easily carried and positioned as required. It is further preferred that a stop pin 58 be attached to the upper end of the handle 56 to prevent the sections 17 and 18 from being opened to a point where the handle 56 is entirely beyond the slot 57. Fig. 10 shows the preferred shape of the partition 48 along the edge 51, and this shape permits the air in the catcher to be directed upward toward the upper section and discharged therethrough while the clippings are carried upwardly and then packed in the section 52 as described.

As mentioned, the air from the mower housing carries dust with it into the catcher 16. Both the dust and the exhaust are prevented from being blown toward the operator who is behind the handle 11. A baffle or deflector 61 of an impervious material is shown cemented to the catcher to be spaced above the top thereof over the length and width of the catcher, and thus it is an integral part of the top which is therefore composed of the elements 18 and 61, with the latter providing the upper surface of the top. The baffle acts as a shield against the dust and exhaust being blown upward, and instead the discharge is to both sides of the catcher below the baffle 61, and there is, therefore, an air outlet opening 60 between the baffle 61 and the top element 18, and the opening 60 is therefore further defined as being on the portion of the top adjacent the front wall 49. The baffle is cemented or otherwise attached to the catcher along the front line 62 and the rear line 63. Also, the sides of the baffle are shown to be directed downward with half rounds 64 and 66 to further deflect the discharge downward.

While a specific embodiment of this invention has been shown and described, it should be obvious that certain changes could be made, and the invention should, therefor, be limited only by the scope of the appended claims.

What is claimed is:

1. A grass catcher adapted to be attached to a rotary mower and including a plurality of side walls and a top and a bottom all interconnected to present a shell-type housing with a hollow interior, one wall of said side walls having an opening in only a part thereof to receive air-impelled clippings directed into said interior and toward another wall of said side walls adjacent to one side of said opening, and a partition disposed in an upright plane in said interior and connected to said shell-type housing and extending from a location on said wall on the other side of said opening for a substantial distance and in the general direction of the path of said air-impelled clippings and to a location spaced from the wall opposite said one wall, said top being air-impervious on the upper surface thereof and having an air-outlet opening in the portion thereof adjacent to said one wall and being on the side of said top corresponding to the side of at least one of said another wall and the wall of said walls opposite to said another wall.

2. A grass catcher adapted to be attached to a rotary mower and including a plurality of side walls and a top and a bottom all interconnected to present a shell-type housing with a hollow interior, one wall of said side walls having an opening in only a part thereof to receive air-impelled clippings directed into said interior and toward another wall of said side walls adjacent to one side of said opening, a partition disposed in an upright plane in said interior and connected to said shell-type housing and extending from a location on said wall on the other side of said opening for a substantial distance and in the general direction of the path of said air-impelled clippings and to a location spaced from the wall opposite said one wall, said top being air-impervious on the upper surface thereof and having an air-outlet opening in the portion thereof at least adjacent to said one wall, and said top having perforations therein adjacent said air-outlet opening for the exhaust of air therethrough and the entrapment of said clippings.

3. A grass catcher adapted to be attached to a rotary mower and including a front wall and side walls and a rear wall and a top and a bottom all interconnected to present a shell-type housing with a hollow interior, said front wall having an opening in only a part thereof to receive a stream of air and clippings directed into said interior and toward one of said side walls disposed adjacent said front wall and to one side of said opening, a partition disposed in an upright plane in said interior and connected to said shell-type housing and extending from a location on said front wall on the other side of said opening and for a substantial distance and in the general direction of the path of said stream and to a location spaced from said rear wall, said top having an air-outlet opening in the portion thereof adjacent to said front wall, and said rear wall being inclined upwardly from said bottom and rearwardly to said top for deflecting said air toward said top.

4. A grass catcher adapted to be attached to a rotary mower and including a plurality of side walls and a top and a bottom all interconnected to present a shell-type housing with a hollow interior, one wall of said side walls having an opening in only a part thereof to receive air-impelled clippings directed into said interior and toward another wall of said side walls adjacent to one side of said opening, a partition disposed in an upright plane in said interior and connected to said shell-type housing and extending from a location on said wall on the other side of said opening for a substantial distance and in the general direction of the path of said air-impelled clippings and to a location spaced from the wall opposite said one wall, said top having an air-outlet opening in the portion thereof adjacent to said one wall and directed horizontally from said catcher for exhausting air horizontally through said opening.

5. A rotary lawn mower and grass catcher combination comprising a mower housing of a generally cylindrical shape in top plan view and including a depending and circular outer flange portion, ground wheels attached to said housing to mobilize the latter in a forward direction of movement, a rotor rotatably mounted in said housing and extending within the confines of said flange portion, fan and cutter blades included in said rotor for creating a circular path of flow of a stream of air and grass clippings through said housing, a handle attached to said housing and extending upwardly therefrom and to the rear of said housing with respect to said forward direction of movement, a rear wall on said mower and disposed transverse to said forward direction, a chute intermediate on and projecting rearwardly of said rear wall at an oblique angle to said forward direction and having an opening therein at said rear of said housing for exhausting said stream at an angle tangential to said circular path and directed toward one side of said forward direction, a grass catcher mounted on said mower and including a plurality of side walls and a top and a bottom all interconnected to present a shell-type housing with a hollow interior, one wall of said side walls having an opening in only a part thereof to receive air-impelled clippings directed into said interior and toward another wall of said side walls adjacent to one side of said opening, a partition disposed in an upright plane in said interior and connected to said shell-type housing and extending from a location on said wall on the other side of said opening for a substantial distance and in the general direction of the path of said air-impelled clippings and to a location spaced from the wall opposite said one wall, said top having an air-outlet opening in the portion thereof adjacent to said one wall, said catcher mounted on said mower with said catcher opening receiving said chute and with said catcher being disposed below said handle and aligned with said forward direction and being removably mounted on said mower for emptying clippings therefrom, and means interengaged between said mower and said catcher for removably attaching the latter two together.

6. A rotary lawn mower and grass catcher combination comprising a mower housing, a mower rotor rotatably mounted on said mower and including fan and cutter blades disposed therein, a handle attached to said housing and extending upwardly therefrom, said housing having an outlet opening therein disposed below said handle, a grass catcher mounted on said mower and including a plurality of side walls and a top and a bottom all interconnected to present a shell-type housing with a hollow interior, one wall of said side walls having an opening in only a part thereof registered with said outlet opening to receive air-impelled clippings directed into said interior and toward another wall of said side walls adjacent to one side of said opening, a partition disposed in an upright plane in said interior and connected to said shell-type housing and extending from a location on said wall on the other side of said opening for a substantial distance and in the general direction of the path of said air-impelled clippings and to a location spaced from the wall opposite said one wall, said top having an air-outlet opening in the portion thereof adjacent to said one wall with said air-outlet opening being directed laterally of said catcher.

References Cited in the file of this patent

UNITED STATES PATENTS

| | | |
|---|---|---|
| D. 172,936 | Phelps | Aug. 31, 1954 |
| 2,071,872 | Cockburn | Feb. 23, 1937 |
| 2,361,637 | Lathrop | Oct. 31, 1944 |
| 2,390,321 | Packwood | Dec. 4, 1945 |
| 2,641,100 | Sylvester | June 9, 1953 |
| 2,734,327 | Whitney | Feb. 14, 1956 |
| 2,737,772 | Jacobsen | Mar. 13, 1956 |
| 2,747,356 | Peterson | May 29, 1956 |
| 2,762,184 | Farrer | Sept. 11, 1956 |
| 2,783,604 | Cahill | Mar. 5, 1957 |
| 2,836,029 | Johnson | May 27, 1958 |
| 2,851,844 | Bailey | Sept. 16, 1958 |
| 2,855,744 | Phelps | Oct. 14, 1958 |
| 2,855,745 | Phelps | Oct. 14, 1958 |
| 2,887,839 | Pommer | May 26, 1959 |